UNITED STATES PATENT OFFICE.

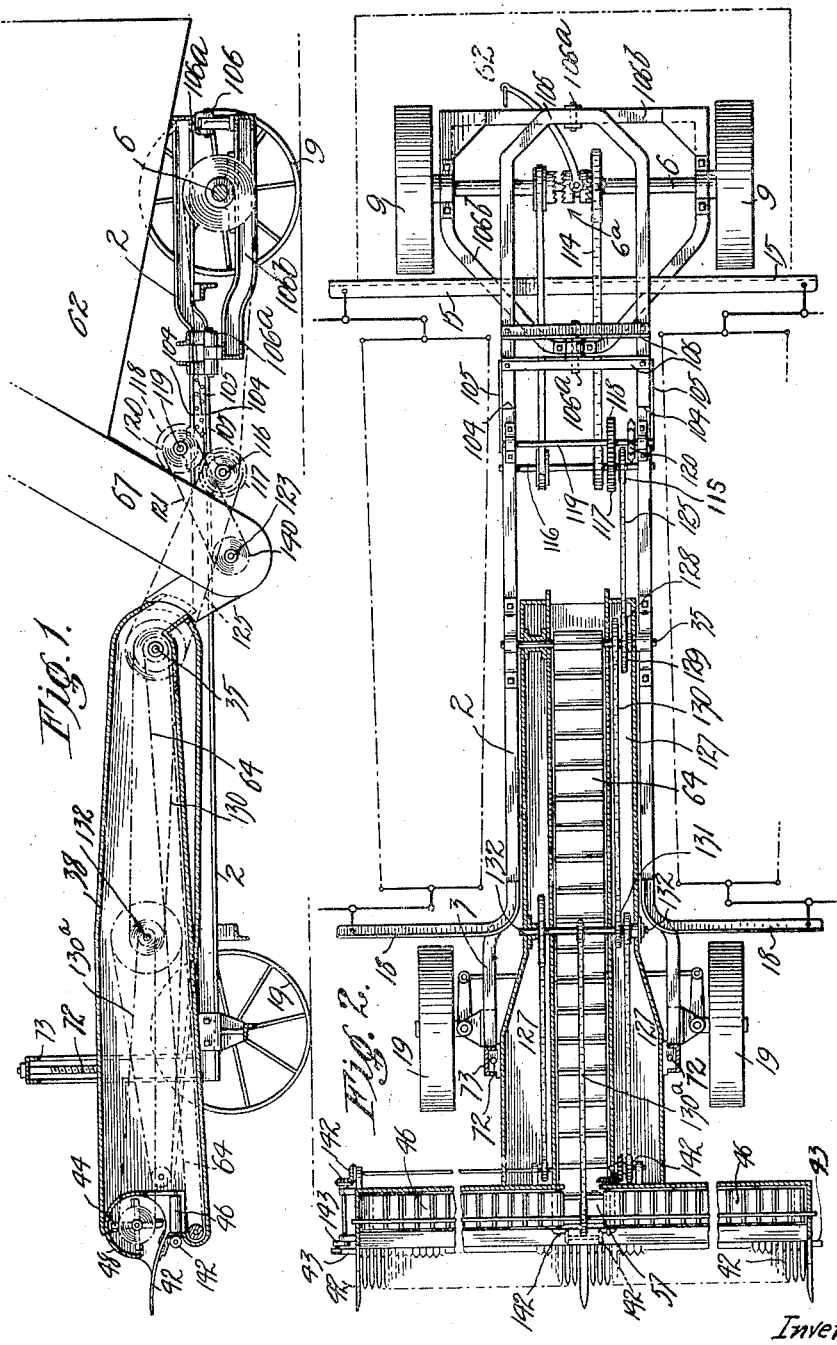

WILLIAM FRANCIS DE BRANDT, OF MELBOURNE, VICTORIA, AUSTRALIA, ASSIGNOR TO THE FOGARTY PATENT INTERCHANGEABLE HARVESTER CORPORATION LIMITED, OF PERTH, WESTERN AUSTRALIA, AUSTRALIA, A CORPORATION OF WESTERN AUSTRALIA.

HARVESTING-MACHINE.

1,346,182. Specification of Letters Patent. Patented July 13, 1920.

Original application filed June 13, 1918, Serial No. 239,711. Divided and this application filed February 26, 1919. Serial No. 279,398.

*To all whom it may concern:*

Be it known that I, WILLIAM FRANCIS DE BRANDT, a subject of the Republic of France, and resident of Melbourne, in the State of Victoria, Commonwealth of Australia, secretary, have invented certain new and useful Improvements in and Relating to Harvesting-Machines, of which the following is a specification.

This invention relates to improvements in harvesting machines and has been devised in order to increase the utility thereof.

An essential feature of the invention consists in the means employed for compensating for any inequality of the surface of the ground over which the machine is traveling.

In order that the invention may be more readily understood it will now be described with reference to the accompanying drawings in which the invention is illustrated and adapted to header harvesting mechanism mounted on a frame having draft appliances arranged on either side thereof between the front steering wheels and the rear wheels.

This application is a division of my copending application Ser. No. 239,711, filed June 13, 1918, for harvesting machines.

In the drawings;—

Figure 1 is a view in vertical central section, and

Fig. 2 is a view in plan of the improvements embodied in the invention.

The frame consists essentially of two main beams 2 arranged in line and substantially close to each other, being strapped and supported by suitable stays and having a swivel or fixed division.

The division of the main frame bars 2 is illustrated in the drawings at 104 which at the division are held together by a strengthening plate 105 arranged within the channel and bolted to the bars or beams 2 on either side of the division.

The front portions 3 of the main beams 2 are bent outwardly and forwardly to allow clearance for the gear casing 127 of the reaper frame 38 and support the stub axles of the front steering wheels 19 which are steered by any suitable means.

The reaper casing 38 is mounted upon the fulcrum spindle 35 and may be raised or lowered in any suitable way as for instance by a threaded nut loosely connected to the frame 38 and a threaded bolt 72, engaging the nut, said bolt 72 being held in a support 73 on either side and at the ends 3 of the main beams 2, the threaded bolts being operated in any convenient manner and preferably as illustrated in United States serial application No. 239,711 filed June 13th, 1918 of which this is a division.

The reaper frame carries reaper mechanism of any suitable design but when fitted to a header harvester, the preferred arrangement consists of the comb 42, reciprocating knife 43, belt conveyers 46, delivering the heads to a central rearwardly projecting conveyer 64 driven from the fulcrum spindle 35 and delivering the material to an elevator 67 which in turn delivers the material to a grain box 68 or to winnowing and threshing mechanism as desired.

Beaters 44 partially incased in a drum 48 operate over the comb 42 in the manner illustrated and throw the material on to the conveyers 46.

To the side of the main beams 2 and between the front wheels 19 and the rear wheels 9, provision is made for the mounting of draft appliances to the front draft beam 18 and the rear draft beam 15, the latter being fitted to the swiveled frame 106$^b$ carrying the rear wheels 9, the mounting of this frame allowing of surface inequalities of the ground to be taken up.

To accomplish this function, the main frame is fitted with cross beams 106 which connect by means of pivot pins or bolts 106$^a$, with the frame 106$^b$ which carries the rear axle 6 and wheels 9.

Pivots 106$^a$ arranged in this way would allow of the taking up of any inequality of the surface of the ground over which the machine is traveling and it will be readily understood that these pivots could, if desired, be mounted above the level of the main frame.

In the construction illustrated, the driving mechanism consists preferably of a variable speed gear 6$^a$ of suitable design fitted to the rear axle 6 and controlled by a clutch operated from the driver's seat.

From the variable speed gear, chains 114 extend to sprockets 115 on a countershaft 116 arranged immediately forwardly of the rear draft bar and on this countershaft is mounted a pinion 117 engaging another pinion 118 on a shaft 119 carrying a sprocket 120 gearing by a chain 121 with another sprocket 122 on the lower elevator spindle 123.

A chain 125 gears with a sprocket on the counter shaft 116 and extends forwardly to a sprocket 128 on the fulcrum spindle 35 above described.

To one side of the conveyer casing 38 is a gear casing 127 within which the forward driving mechanism is maintained and within this gear casing 127 the sprocket 128 driving from the countershaft 116 is arranged. Mounted upon the fulcrum spindle 35 within the gear casing 127 above mentioned, is a V pulley 129 carrying a V belt 130 which extends forwardly to a further V pulley 131 mounted upon the spindle 132. From the spindle 132 separate V belts 130ª permit the speed increasing drive to the beaters and reducing drive to the conveyers to be maintained.

It will be readily understood that the drive may consist solely of V belts and pulleys commencing from the pivot spindle 35 and extending forwardly to the reaper mechanism through intermediate shafts, or the drive may be partly chain and sprocket as will be readily understood.

The drive is thus imparted from the rear axle 6 by the chain 114 to the countershaft 116 which carries a pinion 117 gearing with the pinion 118 on the shaft 119 upon which is mounted the sprocket 120 from which the drive is imparted to the elevator 67. A chain 125 drives the fulcrum spindle 35 upon which is mounted the conveyer 64 extending longitudinally to the front conveyer aprons 46. The drive to the countershaft or spindle 132 is imparted by the chain or V belt 130 through sprockets or V pulleys in the gear casing 127 while the bevel gear 142 drives the knives 43 and front aprons 46. The knife bar is operated by the eccentric 143 as illustrated in Fig. 2.

As above described, by the use of differential gear wheels on the rear axle or counter shaft, the speed of the reaping mechanism may be varied to suit conditions while the gear wheels may be mounted upon ball or roller bearings to reduce the draft.

The belts leading from the speed gear to the spindle 16 are of sufficient length that the rear frame may tilt about the pivots 106ª without being interfered with by the belts or without interfering with the operation of the belts.

What I claim as my invention and desire to secure by Letters Patent is—

1. In a harvesting machine, the combination of a main frame; harvesting mechanism carried by the main frame; ground wheels for supporting the forward part of the main frame; a rear frame supporting the rear part of the main frame; ground wheels for the rear supporting frame; means for driving the harvester mechanism driven by the last named ground wheels; and means for connecting the rear supporting frame and the main frame, said means permitting the rear frame to pivot about a longitudinal horizontal axis relative to the main frame in accommodation to ground undulations.

2. In a harvesting machine, the combination of a main frame comprising two main beams arranged substantially close together and longitudinally of the machine; front steering wheels on the main frame; rear driving wheels; a supporting frame carried by the rear wheels, said frame being swiveled to the main frame; draft appliances between the front steering wheels and the rear wheels and located on each side of the main frame; a reaper frame pivoted at its rear end to a fulcrum support carried by the main frame, said reaper frame comprising a casing; combs, a knife bar, and beaters carried by the reaper frame; conveyers disposed at the rear of the beaters adapted to deliver the material to the center of the reaper frame; a rearwardly extending conveyer arranged centrally of the frame; a grain elevator adapted to receive the grain from the last named conveyer; means to receive the grain from the elevator; a gear casing at the side of the rearwardly extending conveyer; and driving means including a variable speed gear and clutch mechanism connected to the rear wheels for driving the mechanism.

3. In a harvesting machine, the combination of a main frame; reaper mechanism pivotally mounted on the main frame and comprising a reciprocating knife and transverse and longitudinal conveyers; a rear frame; ground wheels for the rear frame; means for pivotally connecting the rear frame to the main frame; grain elevating mechanism; means for receiving the grain from the grain elevator; means for driving the reaper mechanism and the elevator comprising a variable speed gear, a counter shaft, a chain extending from the counter shaft to the variable speed gear, a pinion on the counter shaft, a second pinion meshing with said first pinion, a shaft for the second pinion, a sprocket mounted on said shaft, a chain engaging said sprocket and connected to the elevator, a fulcrum spindle forming the pivot for the reaper frame, a chain extending from the counter shaft to the spindle, driving means extending forwardly from the spindle at the side of the longitudinal conveyer and having a bevel gear for driving the reciprocating knife and a bevel gear for driving the transverse conveyer; and a casing for inclosing the driving means extending at the side of the longitudinal conveyer.

Signed at Melbourne, in the State of Victoria and Commonwealth of Australia, this 6th day of January, A. D. 1919.

WILLIAM FRANCIS DE BRANDT.

Witnesses:
SIDNEY HENDLEY,
ANNIE EDWARDS.